United States Patent
Meng et al.

(10) Patent No.: US 9,342,509 B2
(45) Date of Patent: May 17, 2016

(54) SPEECH TRANSLATION METHOD AND APPARATUS UTILIZING PROSODIC INFORMATION

(75) Inventors: Fan Ping Meng, Beijing (CN); Yong Qin, Beijing (CN); Zhi Wei Shuang, Beijing (CN); Shi Lei Zhang, Beijing (CN)

(73) Assignee: Nuance Communications, Inc., Burlington, MA (US)

( * ) Notice: Subject to any disclaimer, the term of this patent is extended or adjusted under 35 U.S.C. 154(b) by 1201 days.

(21) Appl. No.: 12/609,647

(22) Filed: Oct. 30, 2009

(65) Prior Publication Data

US 2010/0114556 A1    May 6, 2010

(30) Foreign Application Priority Data

Oct. 31, 2008    (CN) .......................... 2008 1 0174628

(51) Int. Cl.
| | |
|---|---|
| *G06F 17/27* | (2006.01) |
| *G10L 13/033* | (2013.01) |
| *G10L 13/08* | (2013.01) |
| *G10L 21/00* | (2013.01) |
| *G06F 17/28* | (2006.01) |

(52) U.S. Cl.
CPC ............ *G06F 17/289* (2013.01); *G10L 13/033* (2013.01); *G10L 13/08* (2013.01); *G06F 17/27* (2013.01); *G10L 21/00* (2013.01)

(58) Field of Classification Search
USPC ....................... 704/1–10, 200–230, 258–269, 704/270–270.1, 277, E21.001–E21.02, 704/E11.001–E11.007, E13.001–E13.014
See application file for complete search history.

(56) References Cited

U.S. PATENT DOCUMENTS

| | | | | |
|---|---|---|---|---|
| 5,278,943 | A | * | 1/1994 | Gasper et al. ................. 704/200 |
| 5,384,893 | A | * | 1/1995 | Hutchins ....................... 704/267 |
| 5,546,500 | A | * | 8/1996 | Lyberg .......................... 704/277 |

(Continued)

FOREIGN PATENT DOCUMENTS

| | | |
|---|---|---|
| CN | 101030368 A | 9/2007 |
| CN | 101281518 A | 10/2008 |
| WO | WO/98/44643 | 10/1998 |

OTHER PUBLICATIONS

Wahlster, "Mobile Speech-to-Speech Translation of Spontaneous Dialogs: An Overview of the Final Verbmobil System", http://verbmobil.dfki.de/ww.html, 2008.

(Continued)

*Primary Examiner* — Pierre-Louis Desir
*Assistant Examiner* — David Kovacek
(74) *Attorney, Agent, or Firm* — Wolf, Greenfield & Sacks, P.C.

(57) ABSTRACT

A method and apparatus for speech translation. The method includes: receiving a source speech; extracting non-text information in the source speech; translating the source speech into a target speech; and adjusting the translated target speech according to the extracted non-text information so that the target speech preserves the non-text information in the source speech. The apparatus includes: a receiving module for receiving source speech; an extracting module for extracting non-text information in the source speech; a translation module for translating the source speech into a target speech; and an adjusting module for adjusting the translated target speech according to the extracted non-text information so that the target speech preserves the non-text information in the source speech.

13 Claims, 2 Drawing Sheets

(56) References Cited

U.S. PATENT DOCUMENTS

| | | | | |
|---|---|---|---|---|
| 5,615,380 A * | 3/1997 | Hyatt | B60R 16/0373 345/520 | |
| 5,677,992 A * | 10/1997 | Lyberg | 704/257 | |
| 5,704,007 A * | 12/1997 | Cecys | G10L 13/047 704/258 | |
| 5,734,794 A * | 3/1998 | White | G09B 5/065 704/235 | |
| 5,850,629 A * | 12/1998 | Holm | G06F 3/16 704/260 | |
| 5,860,064 A * | 1/1999 | Henton | 704/260 | |
| 5,884,266 A | 3/1999 | Dvorak | | |
| 6,006,175 A * | 12/1999 | Holzrichter | 704/208 | |
| 6,226,614 B1 * | 5/2001 | Mizuno et al. | 704/260 | |
| 6,236,966 B1 * | 5/2001 | Fleming | G10L 13/08 704/259 | |
| 6,249,764 B1 * | 6/2001 | Kamae | G06F 17/30014 704/270.1 | |
| 6,356,865 B1 * | 3/2002 | Franz et al. | 704/2 | |
| 6,442,524 B1 * | 8/2002 | Ecker et al. | 704/277 | |
| 6,535,849 B1 * | 3/2003 | Pakhomov | G10L 15/063 704/235 | |
| 6,631,368 B1 | 10/2003 | Adelman et al. | | |
| 6,731,307 B1 * | 5/2004 | Strubbe | G06N 3/004 704/E17.002 | |
| 6,792,406 B1 * | 9/2004 | Fujimura | G10L 13/00 704/257 | |
| 6,826,530 B1 * | 11/2004 | Kasai | G10L 13/047 704/258 | |
| 6,961,704 B1 * | 11/2005 | Phillips et al. | 704/268 | |
| 7,224,367 B2 * | 5/2007 | Miyahara | G06K 9/00268 345/473 | |
| 7,280,968 B2 * | 10/2007 | Blass | 704/266 | |
| 7,486,969 B2 * | 2/2009 | Anzawa | G10L 21/06 348/14.01 | |
| 7,487,093 B2 * | 2/2009 | Mutsuno et al. | 704/266 | |
| 7,603,278 B2 * | 10/2009 | Fukada et al. | 704/260 | |
| 7,761,301 B2 * | 7/2010 | Xu | 704/260 | |
| 7,809,117 B2 * | 10/2010 | Runge | H04M 3/5307 379/100.08 | |
| 7,860,719 B2 * | 12/2010 | Maskey et al. | 704/277 | |
| 7,966,185 B2 * | 6/2011 | Eide | G10L 13/10 704/258 | |
| 8,015,016 B2 * | 9/2011 | Park et al. | 704/277 | |
| 8,073,696 B2 * | 12/2011 | Kato et al. | 704/260 | |
| 8,204,747 B2 * | 6/2012 | Kato et al. | 704/254 | |
| 2002/0184031 A1 * | 12/2002 | Brittan | G10L 13/00 704/260 | |
| 2002/0198717 A1 * | 12/2002 | Oudeyer | G10L 13/00 704/270 | |
| 2003/0028380 A1 * | 2/2003 | Freeland et al. | 704/260 | |
| 2003/0046068 A1 * | 3/2003 | Perronnin | G10L 17/02 704/220 | |
| 2003/0115049 A1 * | 6/2003 | Beutnagel | G10L 13/07 704/220 | |
| 2003/0144842 A1 * | 7/2003 | Addison et al. | 704/260 | |
| 2003/0171850 A1 * | 9/2003 | Kobayashi | G10L 13/00 700/272 | |
| 2003/0185232 A1 * | 10/2003 | Moore | G06Q 20/085 370/465 | |
| 2004/0107101 A1 * | 6/2004 | Eide | 704/260 | |
| 2004/0138872 A1 * | 7/2004 | Nir | 704/10 | |
| 2004/0143430 A1 * | 7/2004 | Said | G06F 17/218 704/2 | |
| 2004/0249634 A1 * | 12/2004 | Degani | G10L 17/26 704/207 | |
| 2005/0065795 A1 * | 3/2005 | Mutsuno et al. | 704/260 | |
| 2005/0144002 A1 * | 6/2005 | Ps | 704/266 | |
| 2005/0187761 A1 * | 8/2005 | Shi | G10L 25/93 704/213 | |
| 2005/0273338 A1 * | 12/2005 | Aaron | G10L 13/08 704/267 | |
| 2006/0004560 A1 * | 1/2006 | Whitelock | G06F 17/2827 704/2 | |
| 2006/0053014 A1 * | 3/2006 | Yoshizawa | G10L 15/06 704/256.4 | |
| 2006/0122834 A1 * | 6/2006 | Bennett | G10L 15/1822 704/256 | |
| 2006/0136216 A1 * | 6/2006 | Shen et al. | 704/266 | |
| 2007/0081529 A1 * | 4/2007 | Sugiyama | G06F 17/28 370/382 | |
| 2007/0203702 A1 * | 8/2007 | Hirose | G10L 13/06 704/256 | |
| 2007/0208569 A1 * | 9/2007 | Subramanian | G10L 19/0018 704/270 | |
| 2008/0010060 A1 * | 1/2008 | Asano | G06F 17/30032 704/10 | |
| 2008/0046241 A1 * | 2/2008 | Osburn | G10L 17/26 704/250 | |
| 2008/0059147 A1 * | 3/2008 | Afify | G06Q 30/02 704/5 | |
| 2008/0065368 A1 | 3/2008 | Narayanan et al. | | |
| 2008/0071529 A1 * | 3/2008 | Silverman | G10L 13/02 704/220 | |
| 2008/0109228 A1 * | 5/2008 | Park et al. | 704/277 | |
| 2008/0167875 A1 * | 7/2008 | Bakis | G10L 13/08 704/258 | |
| 2008/0243474 A1 * | 10/2008 | Furihata et al. | 704/2 | |
| 2008/0300855 A1 * | 12/2008 | Alibaig | G10L 13/00 704/3 | |
| 2008/0300856 A1 * | 12/2008 | Kirk | B07C 3/00 704/4 | |
| 2009/0055158 A1 * | 2/2009 | Xu et al. | 704/2 | |
| 2009/0089063 A1 * | 4/2009 | Meng et al. | 704/270 | |
| 2009/0119102 A1 * | 5/2009 | Bangalore | G10L 15/1807 704/240 | |
| 2009/0234652 A1 * | 9/2009 | Kato et al. | 704/260 | |
| 2010/0082326 A1 * | 4/2010 | Bangalore et al. | 704/3 | |
| 2010/0082345 A1 * | 4/2010 | Wang | G10L 13/00 704/260 | |
| 2010/0114556 A1 * | 5/2010 | Meng et al. | 704/2 | |
| 2011/0270605 A1 * | 11/2011 | Qin et al. | 704/9 | |

OTHER PUBLICATIONS http://domino.watson.ibm.com/comm/research.nsf/pages/r.uit.innovation.html, "Speech-to-Speech Translation", 2008.

Wang, et al. "High-Quality Speech-to-Speech Translation for Computer-Aided Language Learning".

\* cited by examiner

SPEECH TRANSLATION METHOD AND APPARATUS UTILIZING PROSODIC INFORMATION

CROSS REFERENCE TO RELATED APPLICATION

This application claims priority under 35 U.S.C. 119 from Chinese Patent Application 200810174628.8, filed Oct. 31, 2008, the entire contents of which are incorporated herein by reference.

BACKGROUND OF THE INVENTION

1. Field of the invention

The present invention relates to speech processing. More particularly, it relates to a speech translation method and apparatus that preserves speech nuances that are provided by non-text information.

2. Description of Related Art

Current speech-to-speech machine translation processes first change speech into text. They then translate the text into the text of a target language. Finally, they synthesize the text of the target language into target speech by using speech synthesis technology.

However, speech contains information which is far richer than text information. Examples are emotional expressions like laughter and sighs, and prosodic information like stress, intonation, duration, pitch and energy of a speech unit like each character or syllable. Such non text information is very helpful for understanding the real meaning of the speaker. However, the speech synthesized by the speech synthesis technology only relies on the translated text information, and much information behind the text has been lost.

SUMMARY OF THE INVENTION

If non-text information like emotional expressions and prosodic information can be preserved during a speech translation process, it will help greatly for understanding the real meaning of the original speaker.

According to an aspect of the present invention, a computer-implemented speech translation method includes the steps of: receiving a source speech; extracting non-text information in the source speech; translating the source speech into a target speech; and adjusting the translated source speech according to the extracted non-text information so as to make a final target speech to preserve the non-text information in the source speech.

According to another aspect of the present invention, a speech translation apparatus includes: a receiving module for receiving source speech; an extracting module for extracting non-text information in the source speech; a translation module for translating the source speech into a target speech; and an adjusting module for adjusting the translated target speech according to the extracted non-text information so as to make a final target speech to preserve the non-text information in the source speech.

The present invention makes it possible to preserve much richer information other than text information during a speech translation process, thus enabling the real meaning of the original speaker to be understood more fully and effectively through the target speech.

BRIEF DESCRIPTION OF THE DRAWINGS

The present invention and its preferred modes, objects, features and advantages will be better understood by referring to the detailed description of the exemplary embodiments when read in conjunction with the accompanying drawings, in which.

DETAILED DESCRIPTION OF PREFERRED EMBODIMENTS

The present invention presents a solution for preserving non-text information in the source speech in a speech-to-speech translation, in which, first the non-text information in the speech is extracted, such as emotional expressions and prosodic features; then, during performing translation and synthesis on the text information, the non-text information is utilized to achieve a better speech translation effect.

Figure 1:
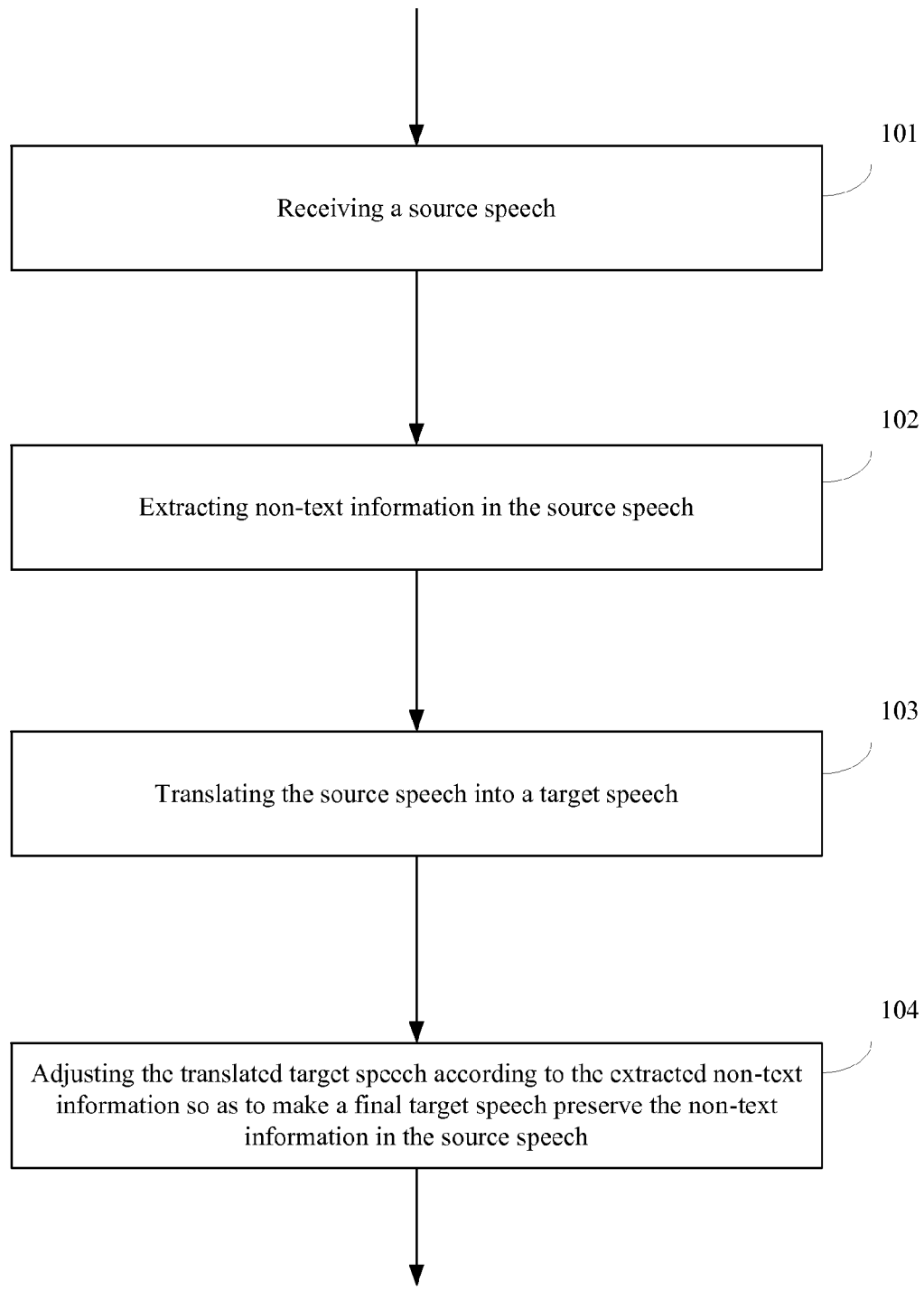
FIG. 1 shows a method for speech translation according to an embodiment of the present invention.

Hereinafter, a method for speech translation according to an embodiment of the present invention is illustrated with reference to FIG. 1. As shown, the method includes the following steps:

In step 101, the source speech is received. The source speech can be speech of any language, for example, English, Chinese, etc.; and can be of any length, e.g., including one sentence or any number of sentences.

In step 102, non-text information in the source speech is extracted. For a specific method for extracting the source speech, reference can be made to the relevant description of the embodiment of the present invention hereinafter.

In step 103, the source speech is translated into target speech. The target speech can be speech of a language which is the same as or different from the source speech, for example, English or Chinese, etc. Any method known in the art can be utilized to translate the source speech into the target speech. For example, any speech recognition method, such as through a speech recognition engine known in the art, can be used to perform speech recognition on the source speech to generate the text of the source speech. Then any text-to-text translation method known in the art can be used to translate the text of the source speech into text of the target speech. Finally any speech synthesis method known in the art can be used to synthesize the target speech according to the text of the target speech. Of course, any other method known in the art or to be developed in the future can also be employed to translate the source speech into the target speech.

In step 104, the translated target speech is adjusted according to the extracted non-text information, so that the final target speech preserves the non-text information in the source speech.

According to some embodiments of the present invention, the non-text information includes non-text sound information, for example, emotional expressions like laughter and sigh, etc. In such embodiments, the step 102 includes extracting non-text sound information such as emotional expressions from the source speech. Any method known in the art can be used to extract non-text sounds from the source speech. For example, non-text sounds can be modeled first when performing speech recognition. In this way, the speech recognition engine can identify the non-text sounds and separate them from the text speech.

According to a further embodiment of the present invention, the method further includes: identifying a relative position of non-text sound information in the source speech, and the above step 104 of adjusting the translated target speech according to the extracted non-text information includes: adding corresponding non-text sound information at the corresponding relative position in the translated target speech. Any method known in the art can be utilized to identify the relative position of the non-text sound information in the source speech. For example, start and end positions of the non-text sounds and text speech can be marked while performing speech recognition on the text speech and non-text sounds in the source speech by the speech recognition engine, so as to obtain the relative positions of the non-text sounds and text speech. In this way, the non-text sounds can be inserted into the target speech according to the relative positions.

For example, the identifying and division of the text speech and non-text sounds in an exemplarily speech, "我今天去北京" by the speech recognition engine is as follows:

0 S-1 S: [laughter]

1 S-2.3 S: 我今天去北京!

Next, a speech-to-speech translation is performed on the text speech in the source speech. Then, the non-text sound identified by the speech recognition engine can be added to the translated target speech according to the relative position between it and the text speech. For example, the non-text sound can be added to the translated target speech directly according to its original position in the source speech. For example, the result of translating the above exemplary Chinese speech segment into English and inserting the emotional expressions in the original speech is as follows:

0 S-1 S: laughter

1 S-2.3 S: I go to Beijing today!

In a speech-to-speech translation, it is generally very hard for the synthesized speech to preserve features of the original speaker. In a simple speech-to-speech translation, the system performs synthesis directly using sounds in a speech synthesis library. In this way, obvious mismatch may exist between the original non-text sounds and the translated text speech.

For this reason, according to a further embodiment of the present invention, the above step 104 for adjusting the translated target speech according to the extracted non-text information includes: performing post-processing on the extracted non-text sound information or the translated speech, so as to make the extracted non-text sound information match the speech features of the translated target speech; adding the post-processed non-text sound information to the translated target speech, or adding the extracted non-text sound information to the post-processed target speech.

The following two methods may be used to make the non-text sounds better match with the translated text speech:

One method is to modify the non-text sound through signal processing to make it better match with the translated speech information. For example, a speech morphing method like frequency warping can be used, taking sounds in a synthesis speech library as the target, to convert the non-text sound to make it tally with the translated speech information. The method is preferable if it is not required to preserve features of the original speaker in that the intelligibility of the text speech information will not be hurt by the sound quality degradation of voice morphing.

Another method is to add a timbre conversion step in the speech-to-speech translation to convert the synthesized speech into speech similar to that of the original speaker. Its disadvantage lies in the sound quality degradation resulted from the modification may hurt the intelligibility of the text speech. Comparatively, the sound quality degradation brought by modification to the non-text information will generally not reduce its intelligibility.

Of course, in other embodiments of the present invention, the step of performing post-processing on the extracted non-text sound information or target speech may not be included.

After the above steps, the non-text sound such as laughter in the source speech is preserved in the target speech. Since the text information itself like "我今天去北京" in the source speech can have a plurality of meanings, e.g., as a simple statement, excitement or question, and the like, the real intention of the speaker is hard to determine only literally. And adding the original non-text sounds like laughter into the target speech may help people to better understand the real intention of the speaker.

According to some other embodiments of the present invention, the non-text information includes prosodic information of speech units in the source speech.

According to an embodiment of the present invention, the speech unit can be any one of a sentence, a phrase, a word, a character or syllable, a phoneme.

According to an embodiment of the present invention, the prosodic information can include any one or more of the duration, fundamental frequency and energy of each speech unit.

That is to say, while performing speech recognition on the source speech, actually the start and end positions of each speech unit can be obtained simultaneously, that is, identifying each speech unit. The speech unit can be a character, a syllable or a phoneme, or a word, a phrase or a sentence. As for Chinese, the unit can be a character. Then any known method in the art can be used to extract prosodic information to which each speech unit corresponds: e.g., the duration, fundamental frequency and energy. The prosodic information also contains rich information. Actually, for a same text, different prosodies can be used to express different meanings. For example, for a same text, different emphasis can be placed by different prosodies. For example, in the expression "I go to Beijing today", it can be stressed that I will go to Beijing, rather than any elsewhere by prolonging the duration and increasing the fundamental frequency of "Beijing". Also, it can be stressed that I go to Beijing "today" rather than "tomorrow" by adding the duration and increasing the fundamental frequency of "today".

If some speech units in the source speech do not have corresponding speech units in the target speech, then information of these speech units in the source speech may be abandoned.

The following shows the speech units with certain durations extracted from an exemplary source speech having a certain duration.

0 S-1.85 S: 我今天去北京

0 S-0.242 S: 我

0.242 S-0.486 S: 今

0.486 S-0.735 S: 天

0.735 S-1.002 S: 去

1.002 S-1.495 S: 北

1.495 S-1.850 S: 京

The prosodic information extracted from the source speech can be used to control the prosodic information of the translated target speech. As described above, the controlled unit (that is, the speech unit) can be a larger unit like a sentence, or a smaller one like a character. Generally speaking, however, the controlled smallest unit should be consistent with the smallest unit in the speech translation. For example, if the smallest unit in the speech translation is a character, then the controlled smallest unit should also be a character. In this way the corresponding relationship between the units of the source speech and the units of the target speech can be established, so that the prosodic information of the source speech units can be used to control the units of the target speech.

There are two methods in which the prosodic information extracted from the source speech controls the prosodic information in the target speech:

The first one is to use the absolute value of prosodic information, that is, making the speech units in the target speech have the same prosodic information as that of the corresponding speech units in the source speech. For example, the duration of the source speech "我今天去北京" is 1.85 seconds, then the duration of the translated target speech, "I go to Beijing today" can also be set at 1.85 seconds. As another example, the average fundamental frequency of the source speech, "我今天去北京", is 200 HZ, and the average fundamental frequency of the translated speech "I go to Beijing today" can also be set at 200 HZ. And as yet another example, for each speech unit, "I", "go to", "Beijing" and "today", in the target speech "I go to Beijing today", the average fundamental frequency can be set the same as that of the corresponding speech units "我", "去", "北京", "今天" in the source speech of "我今天去北京".

The second method is to use a relative value of prosodic information, namely, using the ratio between the real value of the prosodic information of the speech unit in the source speech and a reference value of the prosodic information of the speech unit in the source speech to control the prosodic information of the corresponding speech unit in the target speech. The reference value of the prosodic information reflects the prosodic information of the speech unit in normal conditions or on average. For example, supposing the real duration of a certain source speech "today I went to Beijing" is 1.85 seconds. First, a reference duration of the sentence "today I went to Beijing" i.e., the duration of the sentence in common conditions or on average, is estimated as, for example, 1.375 seconds. Then the ratio between the real duration and the reference duration of the source speech is obtained, e.g., the ratio is 1.85 S/1.375 S=1.2, which means that the speed of the source speech is slower than that of a common speech. Then a reference duration of the target speech "I go to Beijing" is estimated as, e.g., 1.3 S. Then the duration of the target speech is calculated as 1.3 S*1.2=1.65 S. The same method can be applied to speech units smaller than sentences, e.g., a character. For example, the relative values of the durations and/or the fundamental frequencies of the speech units "我", "去 went", "北京 Beijing", "今天 today" in the above exemplary source speech "我今天去北京 today I went to Beijing" can be used to control the values of the durations and/or the fundamental frequencies of the corresponding speech units "I", "go to", "Beijing", "today" in the target speech "I go to Beijing today", so that the emphasis placed by the speaker can be reflected more precisely. When the speech units used are relatively small, e.g., a character, it is preferable to control by using the relative values of the prosodic information, since the absolute values of the prosodic information of the speech-translated speech units may differ significantly while their relative values still remain useful.

The reference value of the prosodic information of a certain speech unit can either represent an average value or a normal value of the prosodic information of the speech unit among all speakers, or represent an average value or a normal value of the prosodic information of the speech unit among all speakers of a certain category, e.g., a category of children, adults or seniors, etc. Many methods known in the art can be used to estimate a reference value of the prosodic information. For example, for a reference duration of a sentence, a simple method is to multiply an normal average duration of a character by the number of characters; or an average duration of each character can be obtained statistically respectively, and then the average durations of the characters can be added up to estimate a reference duration of the sentence.

When sufficient training data are in the possession, a decision tree can be constructed to make a more precise estimation of the reference prosodic information. The decision tree includes a corresponding relationship between the prosodic context information of a speech unit (a character for example) and its reference prosodic information, the prosodic context information including information like the position of the speech unit in the sentence and speech units before and after the speech unit.

The method of constructing such a decision tree by using the training data is known in the art. In this more precise reference prosodic information estimation method, first the prosodic context information of each speech unit (a character for example) in a certain source speech (for example, a sentence) is analyzed, and then, according to the prosodic context information of each speech unit and by using the constructed decision tree, the prosodic reference information of each speech unit, e.g., the reference duration and/or fundamental frequency of each character is predicted.

Thereafter, the actual prosodic information of each speech unit in the certain source speech is acquired, e.g., durations and/or fundamental frequencies of each character, and then a relative value between the actual prosodic information and the reference prosodic information of the respective speech unit in the source speech can be obtained.

Finally, the relative value and the reference prosodic information of the respective speech unit in the target speech, which can be acquired by using the same method as above utilizing the decision tree, can be used to acquire the final prosodic information of the respective corresponding speech unit in the target speech. Of course, the reference durations of each character in the sentence acquired through the decision tree can also be added up to estimate the reference duration of the whole sentence. Then, the actual duration of the sentence can be divided by the reference duration to obtain a relative value of the sentence duration information, so that sentence duration control can be performed on the translated target speech with the relative value.

Therefore, according to an embodiment of the present invention, the above step 102 for extracting the non-text information in the source speech includes: extracting prosodic information of each speech unit; obtaining a relative value of the prosodic information of each unit by comparing the prosodic information of each speech unit with the reference prosodic information of each speech unit; and wherein, the step 104 of adjusting the translated target speech according to the extracted non-text information includes adjusting the prosodic information of the corresponding unit in the translated target speech according to the acquired relative value of the prosodic information of each unit.

According to an embodiment of the present invention, the reference prosodic information of each unit is obtained based on the prosodic context information of the unit and a decision tree containing a corresponding relationship between the prosodic context information and the reference prosodic information of the speech unit.

Above is described a speech translation method according to an embodiment of the present invention. It should be pointed out that the above description is only exemplary, rather than limitation to the present invention. In other embodiments of the present invention, the method may have more, less or different steps, and the sequence between the steps can be different from that is described or may be executed in parallel, and some steps can be merged into larger steps or divided into smaller steps. For example, the above steps 102, 104 can both be executed in parallel with the step 103, or the steps 102 and 104 can be executed during the process of executing the step 103. All these changes are within the scope of the present invention.

Figure 2:
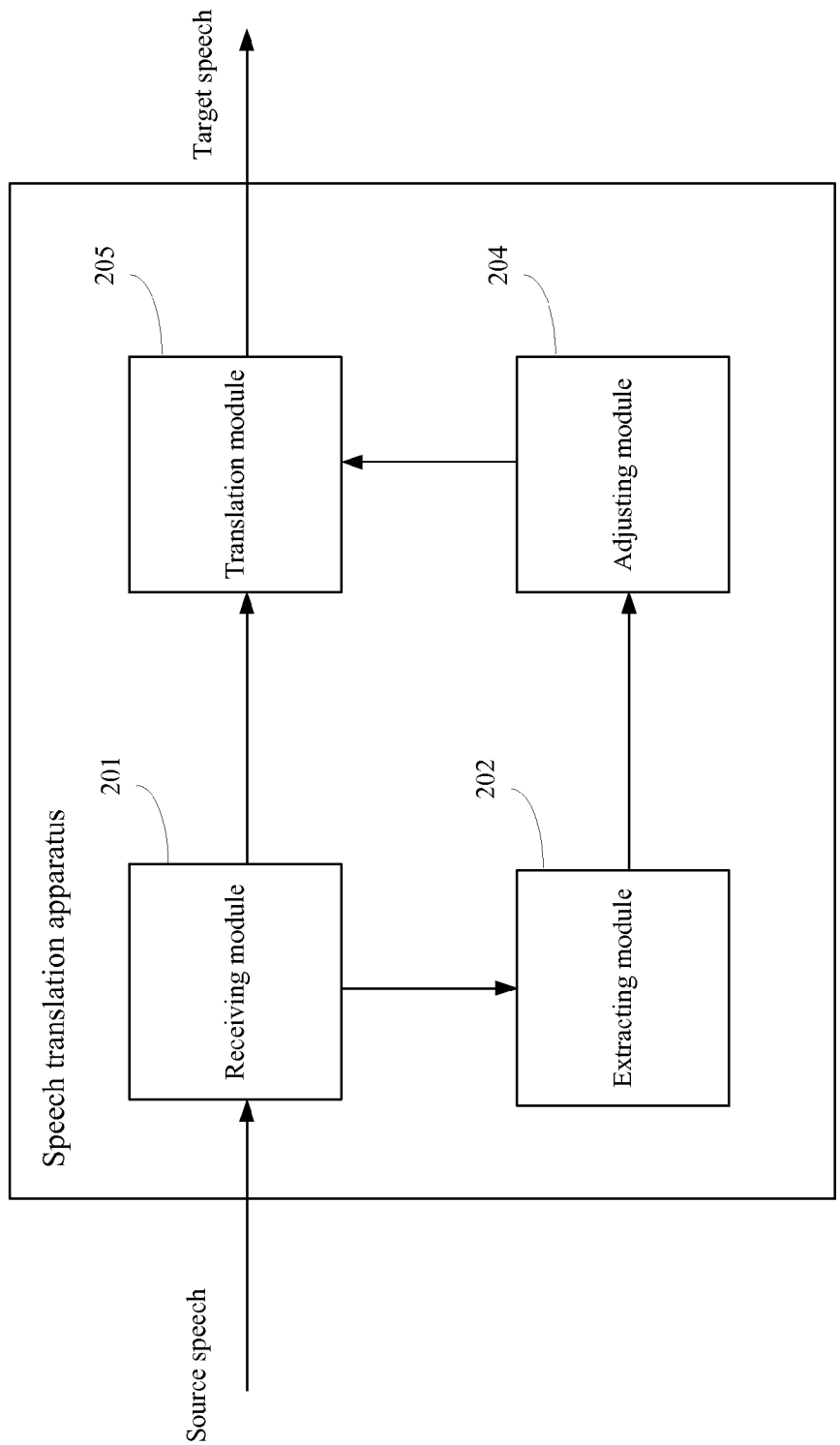
FIG. 2 shows an apparatus for speech translation according to an embodiment of the present invention.

Now referring to FIG. 2, it shows a speech translation apparatus according to an embodiment of the present invention. The speech translation apparatus can be used to execute the above speech translation method according to an embodiment of the present invention. For simplicity, some details redundant with the above description are omitted. Therefore, a more detailed understanding of the speech translation apparatus of the present invention can be obtained with reference to the above description.

As shown, the speech translation apparatus includes: a receiving module 201 for receiving source speech; an extracting module 202 for extracting non-text information in the source speech; a translation module 203 for translating the source speech into a target speech; and an adjusting module 204 for adjusting the translated target speech according to the extracted the non-text information so as to make a final target speech to preserve the non-text information in the source speech.

According to an embodiment of the present invention, the non-text information includes non-text sound information.

According a further embodiment of the present invention, the apparatus further includes: a position identifying module for identifying a relative position of the non-text sound information in the source speech; and wherein the adjusting module 204 is for adding the corresponding non-text sound information in a corresponding relative position in the translated target speech.

According to an embodiment of the present invention, the adjusting module 204 includes: a post-processing means for performing post-processing on the extracted non-text sound information or the translated target speech, so as to make the extracted non-text sound information match speech features of the translated target speech; and means for adding the post-processed non-text sound information to the translated target speech or adding the extracted non-text sound information to the post-processed target speech.

According to an embodiment of the present invention, the non-text information includes prosodic information of a speech unit in the source speech.

According to an embodiment of the present invention, the speech unit is any one of sentence, phrase, word, text or syllable, and phoneme.

According to an embodiment of the present invention, the prosodic information includes any one or more of the duration, fundamental frequency and energy of the speech unit.

According to an embodiment of the present invention, the extracting module 202 includes: means for extracting prosodic information of the unit; means for obtaining a relative value of the prosodic information of the unit by comparing the prosodic information of the unit with reference prosodic information of the unit; and the adjusting module 204 is for controlling the prosodic information of the corresponding speech unit in the target speech according to the obtained relative value of the prosodic information of the unit.

According to an embodiment of the present invention, the reference prosodic information is obtained based on the prosodic context information of the unit and a decision tree containing a corresponding relationship between the prosodic context information of the speech unit and the reference prosodic information thereof.

Above is described a speech translation apparatus according to an embodiment of the present invention. It should be pointed that the above description is only exemplary, rather than limitation to the present invention. In other embodiments of the present invention, the apparatus can have more, less or different modules, and the connection, containment and functional relationships between the modules may be different from that is described, and some modules can be merged into larger modules or divided into smaller ones. For example, any one or more of the receiving module 201, extracting module 202 and controlling module 204 can be within the translation module 203. All these changes are within the scope of the present invention.

The present invention can be realized in hardware, or a combination of hardware and software. The present invention can be realized in a single computer system in a centralized manner, or in a distributed manner in which different components are distributed in some interconnected computer system. Any computer system or other apparatus suitable for executing the method described herein is appropriate. A typical combination of hardware and software can be a computer system with a computer program, which when being loaded and executed, controls the computer system to execute the method of the present invention, and constitute the apparatus of the present invention.

The present invention can also be embodied in a computer program product, which can realize all the features of the method described herein, and when being loaded into a computer system, can execute the method.

Although the present invention has been illustrated and described with reference to the preferred embodiments, those skilled in the art will understand that various changes in form and details may be made thereto without departing from the spirit and scope of the present invention.

What is claimed is:

1. A method, comprising:
   receiving source speech with a computer system having a processing device; and
   using said processing device, performing steps of:
   electronically marking a relative position of and extracting non-text information in the source speech, said non-text information comprising both:
   (a) at least one emotional utterance lacking a word; and
   (b) prosodic information of at least one speech unit in the source speech comprising at least one of emphasis, intonation, duration, fundamental frequency, pitch and energy;
   obtaining a relative value of the prosodic information of the at least one speech unit in the source speech by comparing the prosodic information of the at least one speech unit in the source speech with reference prosodic information for the at least one speech unit, the reference prosodic information representing prosodic information of a sample speech unit under defined conditions;
   translating the source speech into target speech; and
   adjusting the target speech based on the at least one emotional utterance lacking a word and the prosodic information to preserve the non-text information in the source speech, including adjusting prosodic information of at least one speech unit of the target speech based on the relative value of the prosodic information of the at least one speech unit of the source speech, wherein adjusting the target speech based on the at least one emotional utterance lacking a word and the prosodic information comprises adding a corresponding emotional utterance lacking a word to the target speech at a location of the target speech corresponding to the relative position of the at least one emotional utterance lacking a word in the source speech.

2. The method of claim 1, wherein adjusting the target speech based on the at least one emotional utterance lacking a word and the prosodic information comprises:

performing post-processing on the at least one emotional utterance lacking a word or the target speech to match the at least one emotional utterance lacking a word with speech features of the target speech; and adding (i) the at least one emotional utterance lacking a word to the target speech after post-processing of the at least one emotional utterance lacking a word or (ii) the at least one emotional utterance lacking a word to the target speech after post-processing of the target speech.

3. The method of claim 1, wherein the at least one speech unit in the source speech is any one of a sentence, phrase, word, character or syllable, and phoneme.

4. The method of claim 1, wherein the reference prosodic information is obtained based on:

prosodic context information of the at least one speech unit; and a decision tree containing a corresponding relationship between the prosodic context information of the at least one speech unit and the reference prosodic information thereof.

5. The method of claim 1 further comprising outputting a synthesized audible version of the target speech.

6. An apparatus, comprising:

a receiver configured to receive source speech; and at least one computer processing device configured to:

electronically mark a relative position of and extract non-text information in the source speech, said non-text information comprising both:

(a) at least one emotional utterance lacking a word; and (b) prosodic information of at least one speech unit in the source speech comprising at least one of emphasis, intonation, duration, fundamental frequency, pitch and energy;

obtain a relative value of the prosodic information of the at least one speech unit in the source speech by comparing the prosodic information of the at least one speech unit in the source speech with reference prosodic information for the at least one speech unit, the reference prosodic information representing prosodic information of a sample speech unit under defined conditions;

translate the source speech into target speech; and adjust the target speech based on the at least one emotional utterance lacking a word and the prosodic information to preserve the non-text information in the source speech, including adjusting prosodic information of at least one speech unit of the target speech based on the relative value of the prosodic information of the at least one speech unit of the source speech, wherein adjusting the target speech based on the at least one emotional utterance lacking a word and the prosodic information comprises adding a corresponding emotional utterance lacking a word to the target speech at a location of the target speech corresponding to the relative position of the at least one emotional utterance lacking a word in the source speech.

7. The apparatus of claim 6, wherein the at least one computer processing device is further configured to output a synthesized audible version of the target speech.

8. The apparatus of claim 6, further comprising:

post-processing means for performing post-processing on the at least one emotional utterance lacking a word to match the at least one emotional utterance lacking a word with speech features of the target speech; and means for adding the at least one emotional utterance lacking a word to the target speech after post-processing of the at least one emotional utterance lacking a word.

9. The apparatus of claim 6, further comprising:

post-processing means for performing post-processing on the target speech to make the at least one emotional utterance lacking a word match speech features of the target speech; and means for adding the at least one emotional utterance lacking a word to the target speech after post-processing of the target speech.

10. The apparatus of claim 6, wherein the at least one speech unit in the source speech is any one of a sentence, phrase, word, character or syllable, and phoneme.

11. The apparatus of claim 6, wherein the reference prosodic information is obtained based on:

prosodic context information of the at least one speech unit; and a decision tree containing a corresponding relationship between the prosodic context information of the at least one speech unit and the reference prosodic information thereof.

12. The method of claim 1, wherein the at least one emotional utterance lacking a word comprises laughter or a sigh.

13. The apparatus of claim 6, wherein the at least one emotional utterance lacking a word comprises laughter or a sigh.

* * * * *